UNITED STATES PATENT OFFICE.

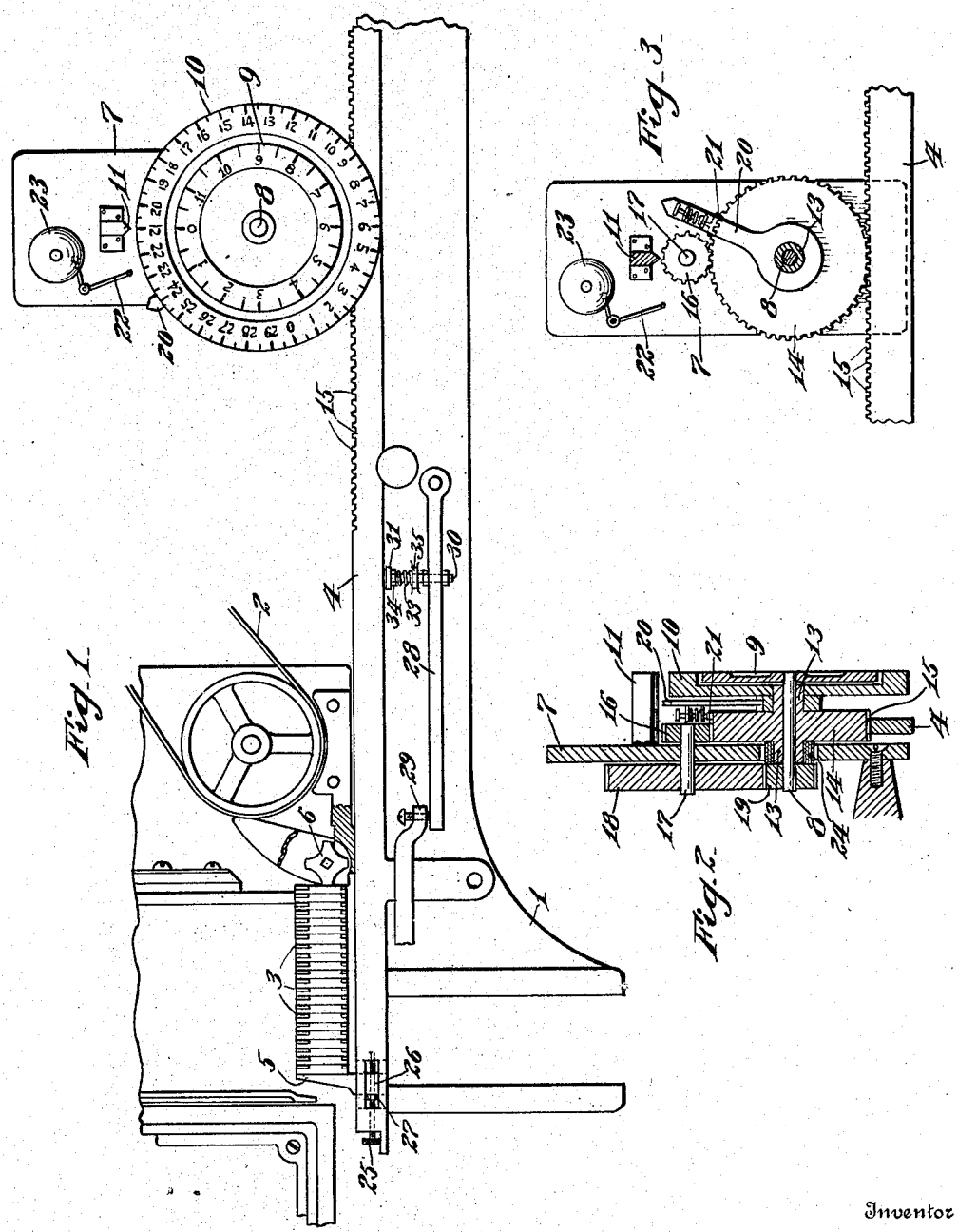

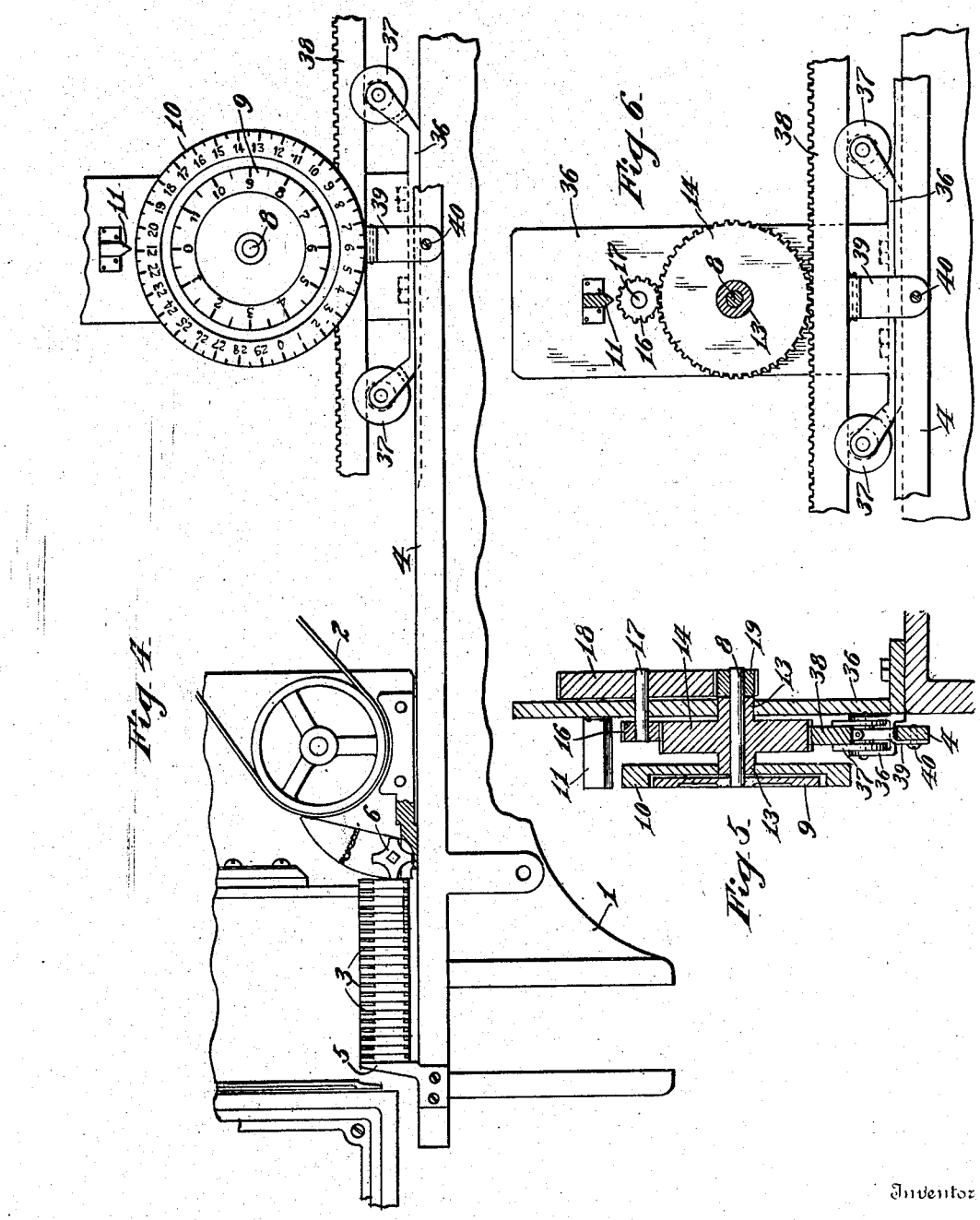

WILLIAM M. RAPP, OF PHILADELPHIA, PENNSYLVANIA.

LINOTYPE-MACHINE.

932,577.   Specification of Letters Patent.   Patented Aug. 31, 1909.

Application filed March 24, 1909. Serial No. 485,375.

*To all whom it may concern:*

Be it known that I, WILLIAM M. RAPP, a citizen of the United States, residing at Philadelphia, in the county of Philadelphia and State of Pennsylvania, have invented certain new and useful Improvements in Linotype-Machines, of which the following is a specification.

My invention relates to improvements in linotype machines, and more particularly to an improved assembler slide, in combination with an improved indicator for indicating at all times the exact length of the line of matrices set up, and capable of a wide range of adjustment for varying lengths of lines.

A further object is to provide an improved indicator, which will indicate the exact measurements in picas and points, so that the operator can tell at a glance just how long the line of matrices is that he has set up, and can determine exactly the size of spaces in hand justifying.

A further object is to provide improvements of this character, which can be readily attached to an ordinary linotype machine, such as in ordinary use, and which will not only indicate the length of the line of matrices, but will also serve to return the bar to a starting position when the brake is released.

With these and other objects in view, the invention consists in certain novel features of construction, and combinations and arrangements of parts as will be more fully hereinafter described and pointed out in the claims.

In the accompanying drawings, Figure 1, is a front elevation illustrating the assembling mechanism of an ordinary linotype machine with my improved indicator and assembler bar, and with certain of the parts broken away to more clearly illustrate the application of my improvements. Fig. 2, is a view in vertical section through the indicator and slide. Fig. 3, is a view of the indicator operating gear, and Figs. 4, 5 and 6, are views similar to Figs. 1, 2 and 3, but illustrating a modified construction.

1 represents the frame of the machine, or rather that portion of the same at the point of assembling the line of matrices.

2 is the ordinary traveling belt for conveying the matrices 3 on to the assembler bar 4, and against the finger 5, and 6 is an ordinary star wheel in front of which the matrices are delivered, and by which they are forced against the end of the line of matrices, and the latter move bodily to the left to make room for incoming matrices at the right hand end of the line adjacent to the star wheel.

A plate 7 is adapted to be secured to the frame work of the machine in any desired manner, and provides a bearing for a shaft 8 on the forward end of which an indicator 9 is secured, and a larger indicator disk 10 is loose on the shaft 8, and is recessed to countersink the smaller disk 9 within the same, and both of said disks register with a pointer 11, fixed on the plate 7, and common to both disks.

The large dial 10 loose on shaft 8 is secured to a hub extension 13, on one side of a large gear wheel 14, the latter in mesh with a line of gear teeth 15 on the assembler slide or bar 4, so that the movement of the assembler slide will turn the dial, as will be readily understood. This gear wheel 14 is in mesh with a small pinion 16 to a short shaft 17 projecting through the plate 7, and and having a large gear wheel 18 secured on its inner end in mesh with a small pinion 19 fixed to shaft 8, so that when gear 14 and dial 10 are turned, such motion will be transmitted through the gears 16, 18 and 19, to turn shaft 8 and dial 9, an appreciably greater distance than the dial 10 is turned, for a purpose which will hereinafter appear.

As is well known, lines of matrices are measured in picas and points. The dial 10 is divided into thirty equal parts, each part containing an indicating point and a numeral in accordance with the distance said mark is from the fixed marker 11, when the dial is in normal position, and said distances are preferably subdivided as shown. These distances correspond each to a distance of movement of the assembler slide to accommodate a matrix of one pica in thickness. In other words, this dial will be moved by the assembler bar, so that a glance at the same will indicate in picas and half picas the length of the assembled line. To further divide the distance of movement of the assembler bar, the dial 9 is provided, which indicates in points, the distances of movement.

By reason of the gearing above described, the dial 9 will be given a complete revolution when the dial 10 moves a distance of one pica. This dial 9 is divided into twelve equal parts containing numerals from 1 to 11, with a cipher at an intermediate point between 1 and 11, and these parts are subdivided as shown.

There are twelve points in a pica, and as these points are divided into half points, it will be seen that the indicator will show at a glance the exact measurement of the line down to half of a point. In other words, the movement of the assembler slide, by reason of the assembling line of matrices, will compel the dials 9 and 10 to turn, so that a glance at them will show the exact measurement of the line in picas and points, which is of great advantage in the use of a machine of this type, as for instance, in hand justifying, as it will demonstrate the exact size of spaces to be used, and will also be of great service in setting up particular work, when it is desired to know exactly where the ditto and similar marks are to be placed in ordinary printing.

In order to set the indicator, so as to set up a line of any given length, I have provided an adjustable stop 20, which is pivotally supported on the shaft 8, and provided with a finger operating detent or catch 21, to engage the teeth of gear 14 and lock the stop at any adjustment. For instance, when this stop is placed on any of the points of the dial 10, it will, first, just before reaching the pointer 11, trip a bell lever 22 to sound a bell 23, and will shortly afterward strike the pointer 11 and stop further movement of the assembler bar, thus allowing the operator to set the indicator to set up lines of any desired length, and capable of course of wide range of variation.

A convolute spring 24 is connected with the hub extension 13 of gear 14 and with the plate 7, so that when the assembler slide or bar 4 is freed, the spring will return the dials and bar to their former positions, that is, with the finger 5 against the star wheel 6. This constant pounding of the finger 5 against the star wheel 6, causes the star wheel to wear slightly, and hence the measurement on the dial would not be accurate unless the finger were adjustable to compensate for this wear.

I have illustrated one form of an adjustable mounting for the finger 5, which consists of a screw 25 mounted to turn in the end of slide 4, and passing through a threaded opening 26 in the finger, so that when the screw 25 is turned, the finger will be moved longitudinally of the slide 4, and a lock nut 27 is provided to lock the finger 5 against accidental movement.

As a brake for the movement of the slide 4, I have provided a lever 28 pivotally supported at one end as shown, and in the path of movement of a strip arm or lever 29, the latter shown broken away, but is such as ordinarily used on a machine of this style, and is pivoted between its ends and adapted to be struck by the elevator not shown, when the line of matrices are elevated, so as to depress lever 28. This lever is connected to a rod 30 on which a brake shoe 31 is secured, and a coiled spring 33 is provided on rod 30 between the adjusting nut 34 on the rod, and a guide collar or bracket 35 on the frame, so as to press the brake shoe against the slide 4, and by means of the nut 34, permit of variations in the tension of the spring, and consequent frictional engagement of the brake shoe with the slide.

Figs. 4, 5 and 6, are views illustrating a modified construction, which requires practically no change in the machine as now in general use, but is merely an attachment for such a machine and can be placed on them without alteration. In this form I provide a frame 36, which is secured to the frame of an ordinary machine, and supports the dials as above explained, and this frame 36 is provided with rollers 37, on which a rack bar 38 is mounted. A hinged bracket 39 connects the rack bar 38 with the assembler slide 4, and this connection may be made in various ways, a screw 40 is shown for the purpose. In this modified construction, while the operation is similar to that above described, there is no necessity for any bell or spring to return the assembler slide, as the bell and spring on the ordinary machine will be utilized, and I have used the same reference characters to indicate the same parts on the modified and preferred forms.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In combination with an assembler slide, of an indicator for recording in picas the movement of the assembler slide, a second indicator for recording the movement of the assembler slide in points, and mechanism connecting said indicators with the slide, whereby said indicators are simultaneously operated by the movement of the slide.

2. In combination with an assembler slide, of a rotary dial for indicating in picas the movement of the slide, a second rotary dial for indicating in points the movement of the slide, and mechanism connecting the slide with said dials, whereby said dials are simultaneously turned when the slide is moved.

3. In combination with an assembler slide, and a toothed rack on said slide, of an indicator for recording in picas the movement of the assembler slide, a second indicator for recording in points the movement of said assembler slide, and gearing between said rack on the slide and said indicators, whereby said indicators are simultaneously operated by the movement of the slide.

4. In combination with an assembler slide, and a toothed rack on said slide, of a rotary dial for recording in picas the movement of the slide, a second rotary dial for recording in points the movement of the slide, and gearing between said toothed rack on the slide and said dials, whereby said dials are simultaneously turned as the slide moves.

5. In combination with an assembler slide, of an indicator, indicating marks on said indicator to register the distance of movement of the slide in picas, a second indicator subdivided into twelve equal parts, and gearing between said slide and indicators, whereby said indicators are operated simultaneously with the movement of the slide, and the last mentioned indicator records a complete revolution at every movement of the first mentioned indicator a distance of one pica.

6. In combination with an assembler slide, of a rotary dial having marks thereon to indicate in picas the distance of movement of the slide, a second rotary dial divided into twelve equal parts to record in points the distance of movement of the slide, and gearing between said slide and said dials, whereby both dials are turned simultaneously with the movement of the slide, and the last mentioned dial is given a complete revolution when the first mentioned dial moves a distance of one pica.

7. In combination with a linotype machine, of an assembler slide, a rotary dial constructed and adapted to be revolved by the movement of said slide, a second dial, means for revolving the second dial faster than the first mentioned dial, whereby said first mentioned dial will indicate in picas, and the last mentioned dial in points the movement of said slide.

8. In combination with a linotype machine and an assembler slide, of a dial, a fixed pointer registering with the dial, a gear wheel connected with the dial rack teeth on the slide meshing with said gear, a second dial and means for transmitting motion from said gear to said second dial, whereby the second dial is driven at a greater speed than the first dial, and said dials containing indicating marks to indicate in picas and points the movement of said slide.

9. In combination with a linotype machine and an assembler slide, of a rotary dial having a recessed face, a smaller dial mounted to turn in the recessed face of said first mentioned dial, a gear on said first mentioned dial, rack teeth on the slide meshing with said gear, a chain of gearing connecting said first mentioned gear with the smaller dial, whereby the smaller dial is turned a complete revolution.

10. In combination with a linotype machine and an assembler slide, of an indicator, means connecting said indicator and slide, whereby the indicator is caused to record the movement of the slide, and a spring adapted to turn said indicator and return the same and the slide to normal position.

11. In combination with a linotype machine and an assembler slide, of two indicating dials, one dial subdivided to indicate "pica" measurements, the other dial subdivided to indicate "point" measurements, and mechanism for transmitting motion from said assembler slide to said indicators, whereby the point dial will be turned a complete revolution at every movement of the pica dial a distance of one pica.

12. In combination with a linotype machine and an assembler slide, of a rotary dial, a fixed pointer registering with said dial, and an adjustable stop engaging said dial and adapted to strike said pointer and limit the turning movement of said dial.

13. In combination with a linotype machine and an assembler slide, of a rotary dial, a fixed pointer, means for transmitting motion from said slide to said dial, a bell, and an adjustable stop adapted to sound said bell and strike said pointer to stop the movement of said dial and slide.

14. In combination with a linotype machine and an assembler bar, a rotary indicating the length of movement of said slide, and an adjustable matrix engaging finger on said slide.

15. In combination with a linotype machine and an assembler bar, a rotary indicator constructed and adapted to record the movement of said bar, a pivoted lever, a rod on said lever, a brake shoe on said rod engaging the under face of said bar, a spring on said rod pressing the said shoe against the bar, means for adjusting the tension of said spring, and means for moving the lever to release the bar.

In testimony whereof I have signed my name to this specification in the presence of two subscribing witnesses.

WILLIAM M. RAPP.

Witnesses:
S. W. FOSTER,
J. A. L. MULHALL.